US012750761B2

(12) United States Patent
Lincoln et al.

(10) Patent No.: US 12,750,761 B2
(45) Date of Patent: Sep. 29, 2026

(54) ORBIT-AWARE ROUTING

(71) Applicant: SRI International, Menlo Park, CA (US)

(72) Inventors: Patrick Denis Lincoln, Woodside, CA (US); Steven M. Dawson, Woodside, CA (US); Phillip A Porras, Cupertino, CA (US); Keith M. Skinner, Sunnyvale, CA (US); Martin W. Fong, Redwood City, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 384 days.

(21) Appl. No.: 18/552,408

(22) PCT Filed: Mar. 26, 2021

(86) PCT No.: PCT/US2021/024472
§ 371 (c)(1),
(2) Date: Sep. 25, 2023

(87) PCT Pub. No.: WO2022/203688
PCT Pub. Date: Sep. 29, 2022

(65) Prior Publication Data

US 2024/0089824 A1 Mar. 14, 2024

(51) Int. Cl.
*H04W 40/20* (2009.01)
*H04L 45/12* (2022.01)
(Continued)

(52) U.S. Cl.
CPC ........... *H04W 40/20* (2013.01); *H04L 45/126* (2013.01); *H04W 64/003* (2013.01); *H04W 84/06* (2013.01)

(58) Field of Classification Search
None
See application file for complete search history.

(56) References Cited

U.S. PATENT DOCUMENTS 6,404,769 B1 * 6/2002 Kapoor .............. H04B 7/18584 342/353
9,094,856 B1 * 7/2015 Tian ...................... H04L 45/125
(Continued)

OTHER PUBLICATIONS

"From metrics to insight: Power your metrics and alerting with the leading open-source monitoring solution.", Prometheus, Retrieved from: https://prometheus.io/, Accessed on Jan. 26, 2022, 5 pp.
(Continued)

*Primary Examiner* — Lonnie V Sweet
(74) *Attorney, Agent, or Firm* — Shumaker & Sieffert, P.A.

(57) ABSTRACT

A satellite orbiting the Earth may perform orbit-aware routing by receiving a data packet, determining whether a final destination plane of the data packet is different from an orbital plane of the satellite, in response to determining that the final destination plane of the data packet is different from the orbital plane of the satellite, determining whether the satellite is able to communicate with one or more cross-plane neighboring satellites, selecting a neighboring satellite to receive the data packet based at least in part on whether the satellite is able to communicate with one or more cross-plane neighboring satellites, and forwarding the data packet to the neighboring satellite.

17 Claims, 8 Drawing Sheets

(51) Int. Cl.
*H04W 64/00* (2009.01)
*H04W 84/06* (2009.01)

(56) References Cited

U.S. PATENT DOCUMENTS

| | | | | |
|---|---|---|---|---|
| 2008/0170536 | A1 | 7/2008 | Marshack et al. | |
| 2012/0263042 | A1 | 10/2012 | Natarajan et al. | |
| 2017/0034250 | A1* | 2/2017 | Sobhani | H04W 84/06 |
| 2018/0254824 | A1* | 9/2018 | Speidel | H04B 7/18532 |

OTHER PUBLICATIONS

"Grafana: The open observability platform", Grafana, retrieved from: https://grafana.com/, Accessed on: Jan. 26, 2022, 2 pp.
International Preliminary Report on Patentability from International Application No. PCT/US2021/024472 dated Sep. 12, 2023, 12 pp.
International Search Report and Written Opinion of International Application No. PCT/US2021/024472 dated Jun. 23, 2023, 18 pp.

* cited by examiner

ORBIT-AWARE ROUTING

This application is a national stage application under 35 U.S.C. § 371 of PCT Application No. PCT/US2021/024472, filed Mar. 26, 2021. The entire contents of PCT Application No. PCT/US2021/024472 is incorporated herein by reference in its entirety.

TECHNICAL FIELD

This disclosure relates to data routing, and, more specifically, to data routing between satellites in orbit.

BACKGROUND

Satellites in space that orbit the Earth can perform routing of data between ground stations on Earth by routing data between satellites to facilitate global data communications coverage. Unlike a terrestrial network, a satellite network includes nodes that are in constant motion and that change positions with respect to each other and to the ground. Such a dynamic environment may require sophisticated management beyond that of terrestrial networks for sophisticated routing decision-making for path optimization.

SUMMARY

In general, this disclosure describes techniques for orbit-aware routing of data by satellites that provide for autonomous, dynamic (on-demand) routing by satellites, with little or no reliance on ground systems for route generation and very low routing management overhead. Instead, a satellite that receives data for routing may determine how to route the data to a neighboring satellite without relying on information from a ground station. Such orbit-aware routing may be highly responsive to changing crosslink and node outages, providing rapid re-routing around problematic links and nodes.

In one example, a method for orbit-aware routing includes: receiving, by a satellite orbiting the Earth, a data packet; determining, by the satellite, whether a final destination plane of the data packet is different from an orbital plane of the satellite; in response to determining that the final destination plane of the data packet is different from the orbital plane of the satellite, determining, by the satellite, whether the satellite is able to communicate with one or more cross-plane neighboring satellites; selecting, by the satellite, a neighboring satellite to receive the data packet based at least in part on whether the satellite is able to communicate with one or more cross-plane neighboring satellites; and forwarding, by the satellite, the data packet to the neighboring satellite.

In another example, a satellite includes: a memory; and processing circuitry operably coupled to the memory and configured to: receive a data packet; determine whether a final destination plane of the data packet is different from an orbital plane of the satellite; in response to determining that the final destination plane of the data packet is different from the orbital plane of the satellite, determine whether the satellite is able to communicate with one or more cross-plane neighboring satellites; select a neighboring satellite to receive the data packet based at least in part on whether the satellite is able to communicate with one or more cross-plane neighboring satellites; and forward the data packet to the neighboring satellite.

In another example, a computer-readable storage medium storing instructions that, when executed by one or more processors of a satellite orbiting the Earth, cause the one or more processors of the satellite to: receive a data packet; determine whether a final destination plane of the data packet is different from an orbital plane of the satellite; in response to determining that the final destination plane of the data packet is different from the orbital plane of the satellite, determine whether the satellite is able to communicate with one or more cross-plane neighboring satellites; select a neighboring satellite to receive the data packet based at least in part on whether the satellite is able to communicate with one or more cross-plane neighboring satellites; and forward the data packet to the neighboring satellite.

The details of one or more examples are set forth in the accompanying drawings and the description below. Other features, objects, and advantages will be apparent from the description and drawings, and from the claims.

DETAILED DESCRIPTION

Figure 1:
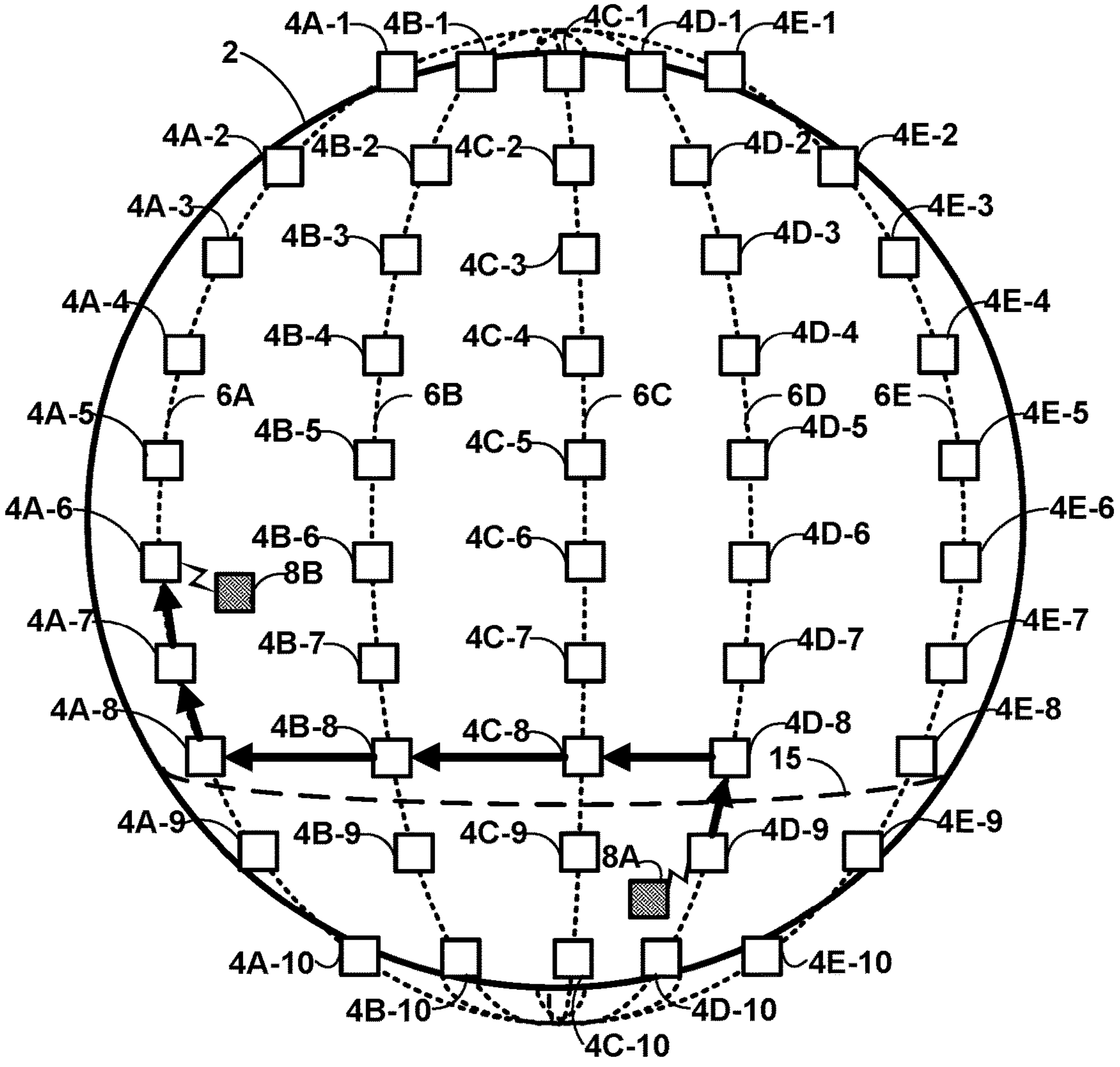
FIG. 1 is a block diagram illustrating an example satellite constellation that performs orbit-aware routing, in accordance with aspects of this disclosure.

FIG. 1 is a block diagram illustrating an example satellite constellation that performs orbit-aware routing, in accordance with aspects of this disclosure. As shown in FIG. 1, satellites 4A-1 to 4A-10, 4B-1 to 4B-10, 4C-1 to 4C-10, 4D-1 to 4D-10, and 4E-1 to 4E-10 (collectively "satellites 4") may orbit around Earth 2 along orbital planes 6A-6E (hereinafter "orbital planes 6") to form a satellite constellation. Satellites 4A-1 to 4A-10 may orbit along orbital plane 6A, satellites 4B-1 to 4B-10 may orbit along orbital plane 6B, satellites 4C-1 to 4C-10 may orbit along orbital plane 6C, satellites 4D-1 to 4D-10 may orbit along orbital plane 6D, and satellites 4E-1 to 4E-10 may orbit along orbital plane 6E. As FIG. 1 is a two-dimensional representation of satellites 4 situated around Earth 2, FIG. 1 illustrates only a portion of orbital planes 6 and a portion of satellites 4 that are situated along orbital planes 6.

Each of satellites 4 may be an artificial satellite, such as a communication satellite, placed into space around Earth 2. Each of satellites 4 can communicate (e.g., send and receive data) with other satellites and with ground stations on Earth 2, so that the satellite constellation of satellites 4 act as a communication network to transmit data between ground stations on Earth 2.

Ground stations on Earth 2, such as ground stations 8A and 8B, may be terrestrial radio stations located on the surface of Earth 2 or in Earth 2's atmosphere, that transmit and receive radio waves to communicate with satellites 4. For example, a ground station may be able to communicate, such as by sending or receiving radio waves, with satellites that are within the ground station's line of sight. In other examples, ground stations may be any endpoint on Earth 2 that may communicate with satellites 4, such as mobile phones, satellite radios, antenna, and the like.

Communication between satellites 4 orbiting along the same orbital plane, such as between satellite 4A-1 and satellite 4A-2 both orbiting along orbital plane 6A, is referred to herein as in-plane communication. Similarly, communication between satellites 4 orbiting along different orbital planes, such as between satellite 4B-4 orbiting along orbital plane 6B and satellite 4C-4 orbiting along in orbital plane 6C, is referred to herein as cross-plane communication. A satellite may be able to communicate with neighboring satellites, including in-plane neighboring satellites and cross-plane neighboring satellites. For example, a satellite, such as satellite 4C-4 along orbital plane 6C, may have two in-plane neighboring satellites 4C-3 and 4C-5 that are the closest satellites in the same orbital plane 6C as satellite 4C-4 and two cross-plane neighboring satellites 4B-4 and 4D-4 that are the closest satellites in the two neighboring orbital planes 6B and 6D, respectively to orbital plane 6C of satellite 4C-4.

Satellites 4 may form a communication network that ground stations on Earth 2 may use to route data between ground stations on Earth 2. For example, to route data from ground station 8A to ground station 8B, ground station 8A may transmit the data to satellite 4D-8 that is the closest satellite that is within line of sight to ground station 8A. Satellites 4 may route the data received from ground station 8A through the constellation of satellites 4 to the closest satellite that is within line of sight to ground station 8B, and may transmit the data to ground station 8B, thereby performing routing of data between ground stations 8A and 8B.

However, certain technical problems may arise when satellites 4 perform data routing between ground stations. For example, a satellite that participates in such data routing may not always be able to communicate with a ground station in order to receive instructions from a ground station as to how to route data. In another example, a satellite that is close to the poles (e.g., north pole or south pole) of the Earth 2, such that the satellite is situated above a cutoff latitude in the northern hemisphere of the Earth 2 or below a cutoff latitude in the southern hemisphere of the Earth 2, may not be able to maintain communication links with cross-plane neighboring satellites because satellites 4 in different orbital planes 6 may converge near the poles of the Earth 2 and cross paths, thereby potentially causing radio frequency interference and preventing a satellite from communicating with its cross-plane neighboring satellites.

In accordance with aspects of the present disclosure, satellites 4 may perform orbit-aware routing to route data between ground stations on Earth 2. When performing orbit-aware routing, satellites 4 may be able to route data through satellites 4 from an origin ground station to a destination ground station without having to communicate with ground stations on Earth 2 besides receiving the data from the origin ground station and forwarding the data to the destination ground station. Further, when performing orbit-aware routing, satellites 4 may be able to route data through satellites 4 while taking into account the cutoff latitudes, thereby being able to more quickly and intelligently route data between the origin ground station and the destination ground station.

To perform orbit-aware routing, a satellite may, after receiving data from another satellite or from a ground station, determine whether the final destination plane of the data is the same as the orbital plane of the satellite. That is, a satellite may determine whether it is in the same orbital plane as the destination satellite that is to communicate with the destination ground station to forward the data to the ground station. If the satellite determines that it is in the same orbital plane as the satellite that is to communicate with the destination ground station, the satellite may forward the data to the in-plane neighboring satellite that is closer to the destination satellite relative to the satellite.

If the satellite determines that it is not in the same orbital plane as the satellite that is to communicate with the destination ground station, the satellite may determine whether it is able to forward the data to the cross-plane neighboring satellite that is closer to the final destination plane relative to the orbital plane of the satellite. For example, the satellite may not be able to forward the data to the cross-plane neighboring satellite that is closer to the final destination plane relative to the orbital plane of the satellite if the satellite is above the cutoff latitude in the northern hemisphere or below the cutoff latitude in the southern hemisphere, or if for any other reason the link between the satellite and the cross-plane neighboring satellite is down.

If the satellite determines it is able to forward the data to the cross-plane neighboring satellite that is closer to the final destination plane relative to the orbital plane of the satellite, the satellite may forward the data to the cross-plane neighboring satellite that is closer to the final destination plane relative to the orbital plane of the satellite. However, if the satellite determines that it is unable to forward the data to the cross-plane neighboring satellite that is closer to the final destination plane relative to the orbital plane of the satellite, the satellite may forward the data to an in-plane neighboring satellite. For example, the satellite may not be in a predetermined region that allows communication with cross-plane neighboring satellites if it is above the cutoff latitude in the northern hemisphere or below the cutoff latitude in the southern hemisphere. Thus, if the satellite determines that it is above the cutoff latitude in the northern hemisphere or below the cutoff latitude in the southern hemisphere, the satellite may forward the data to an in-plane neighboring satellite that is relatively closer to the equator relative to the satellite so that the data may move below the cutoff latitude in the northern hemisphere or above the cutoff latitude in the southern hemisphere.

In the example of FIG. 1, satellite 4D-9 may receive data from ground station 8A to be forwarded to ground station 8B. After receiving the data from ground station 8A, satellite 4D-8 may determine that the final destination plane of the data is orbital plane 6A, which is different from orbital plane 6D of satellite 4D-9. However, because satellite 4D-9 is below cutoff latitude 15 in the southern hemisphere of the Earth 2, satellite 4D-9 is unable to forward the data to cross-plane neighboring satellite 4C-9 that is closer to orbital plane 6A relative to satellite 4D-9. Instead, satellite 4D-9 may forward the data to in-plane neighboring satellite 4D-8, which is the in-plane neighboring satellite of satellite 4D-9 that is closer to the equator of the Earth 2 relative to satellite 4D-9.

Satellite 4D-8 may, after receiving data from satellite 4D-9, determine that the final destination plane of the data is orbital plane 6A, which is different from orbital plane 6D of satellite 4D-8. Because satellite 4D-8 is not below cutoff latitude 15 in the southern hemisphere of the Earth 2, satellite 4D-8 may forward the data to cross-plane neighboring satellite 4C-8 that is closer to orbital plane 6A relative to satellite 4D-8.

Satellite 4C-8 may, after receiving the data from satellite 4D-8, may determine that the final destination plane of the data is orbital plane 6A, which is different from orbital plane 6C of satellite 4C-8. Thus, satellite 4C-8 may forward the data to cross-plane neighboring satellite 4B-8 that is closer to orbital plane 6A relative to satellite 4C-8. Satellite 4B-8 may, after receiving the data from satellite 4C-8, may determine that the final destination plane of the data is orbital plane 6A, which is different from orbital plane 6B of satellite 4B-8. Thus, satellite 4B-8 may forward the data to cross-plane neighboring satellite 4A-8 that is closer to orbital plane 6A relative to satellite 4B-8.

Satellite 4A-8 may, after receiving the data from satellite 4B-8, determine that the final destination plane of the data is orbital plane 6A, which is the same orbital plane 6A of satellite 4A-8. Thus, satellite 4A-8 may forward the data to in-plane neighboring satellite 4A-7 which is the in-plane neighboring satellite of satellite 4A-8 that is closer to ground station 8B relative to satellite 4A-8.

Satellite 4A-7 may, after receiving the data from satellite 4A-8, determine that the final destination plane of the data is orbital plane 6A, which is the same orbital plane 6A of satellite 4A-7. Thus, satellite 4A-7 may forward the data to in-plane neighboring satellite 4A-6 which is the in-plane neighboring satellite of satellite 4A-7 that is closer to ground station 8B relative to satellite 4A-7. Satellite 4A-6 may, after receiving the data from satellite 4A-7, determine that it is the destination satellite (e.g., the satellite that is closest to as within line-of-sight of ground station 8B) for the data, and may transmit the data to ground station 8B.

Figure 2:
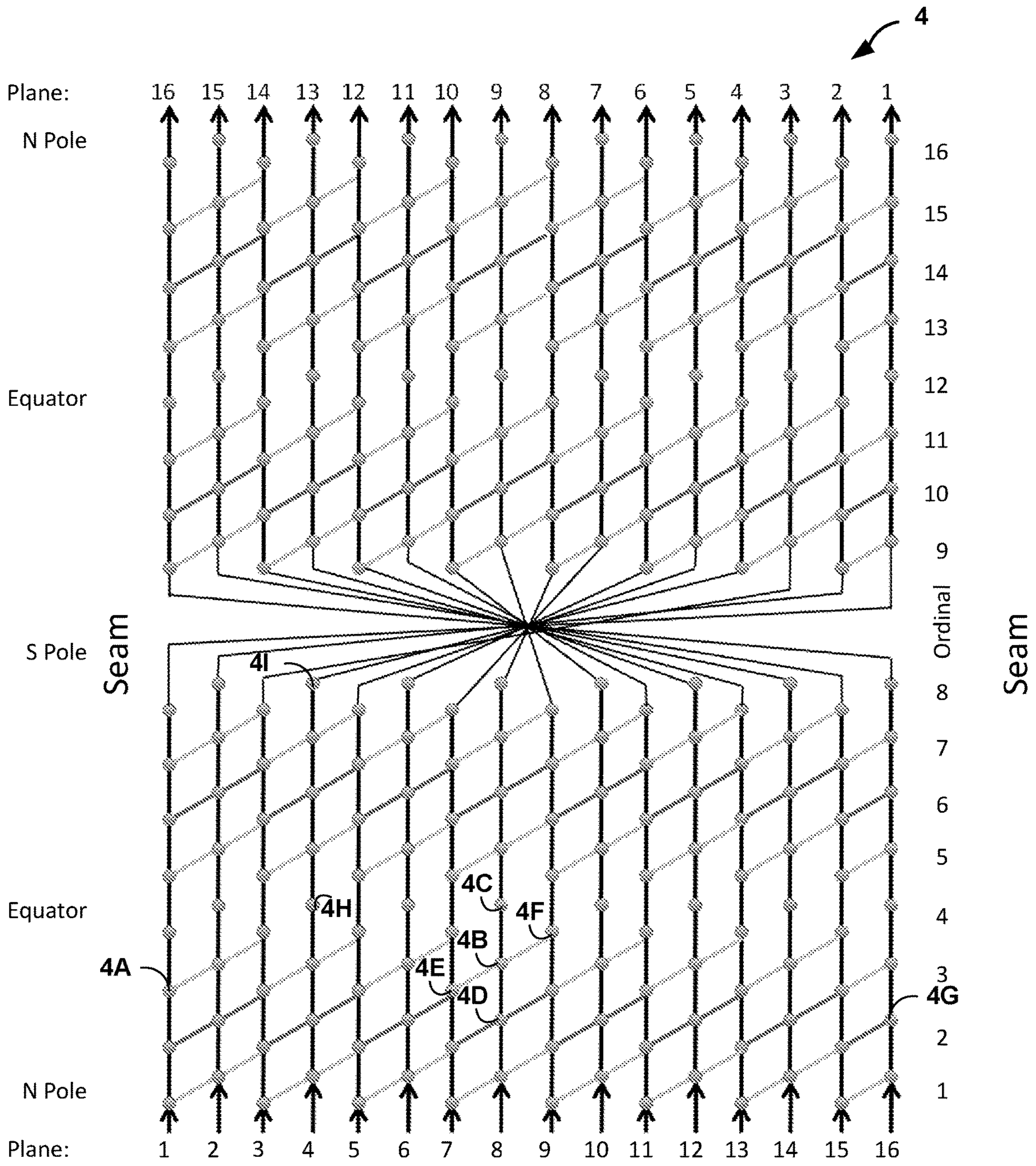
FIG. 2 is a block diagram illustrating an example configuration of satellites for performing orbit-aware routing, in accordance with aspects of this disclosure.

FIG. 2 is a block diagram illustrating an example configuration of satellites 4 for performing orbit-aware routing, in accordance with aspects of this disclosure. As shown in FIG. 2, each satellite of satellites 4 may orbit in one of a plurality of orbital planes, and within its orbital plane, each satellite of satellites 4 may be ordered according to an ordinal, such that the location of each satellite is associated with an associated orbital plane and an ordinal to topologically indicate the location of the satellite in the grid of nodes in satellites 4. Thus, in the example of FIG. 2, satellite 4A may have an associated orbital plane of 1 and an associated ordinal of 3, which can also be represented as the plane-ordinal pair (1, 3).

In general each satellite may be able to communicate (e.g., send and receive data) with in-plane neighboring satellites and cross-plane neighboring satellites. In-plane neighboring satellites may be the closest satellites to the satellite that are in the same orbital plane as the satellite. Cross-plane neighboring satellites may be the closest satellites to the satellite that are in the nearest orbital planes to the orbital plane of the satellite. Thus, satellite 4B may be able to communicate with two in-plane neighboring satellites 4C and 4D that are on the same orbital plane as satellite 4B, and may also be able to communicate with two cross-plane neighboring satellites 4E and 4F that are the nearest orbital planes to the orbital plane of satellite 4B.

However, in some cases, a satellite may be able to communicate with fewer than two cross-plane neighboring satellites. For example, if two cross-plane satellites are traveling in opposite directions, the two cross-plane satellites may not be able to communicate with each other. The dividing line between satellites travelling in opposite directions is referred to herein as a seam. In FIG. 2, the arrows denote the direction of travel of satellites in the ordinal planes. Thus, while satellite 4A is a cross-plane neighboring satellite to satellite 4G, satellites 4A and 4G are traveling in different directions and thus are unable to communicate with each other. In addition, satellites near the equator, such as satellite 4H, or satellites near the poles of the Earth, such as satellite 4I, may not be able to communicate with its cross-plane neighboring satellites.

Figure 3:
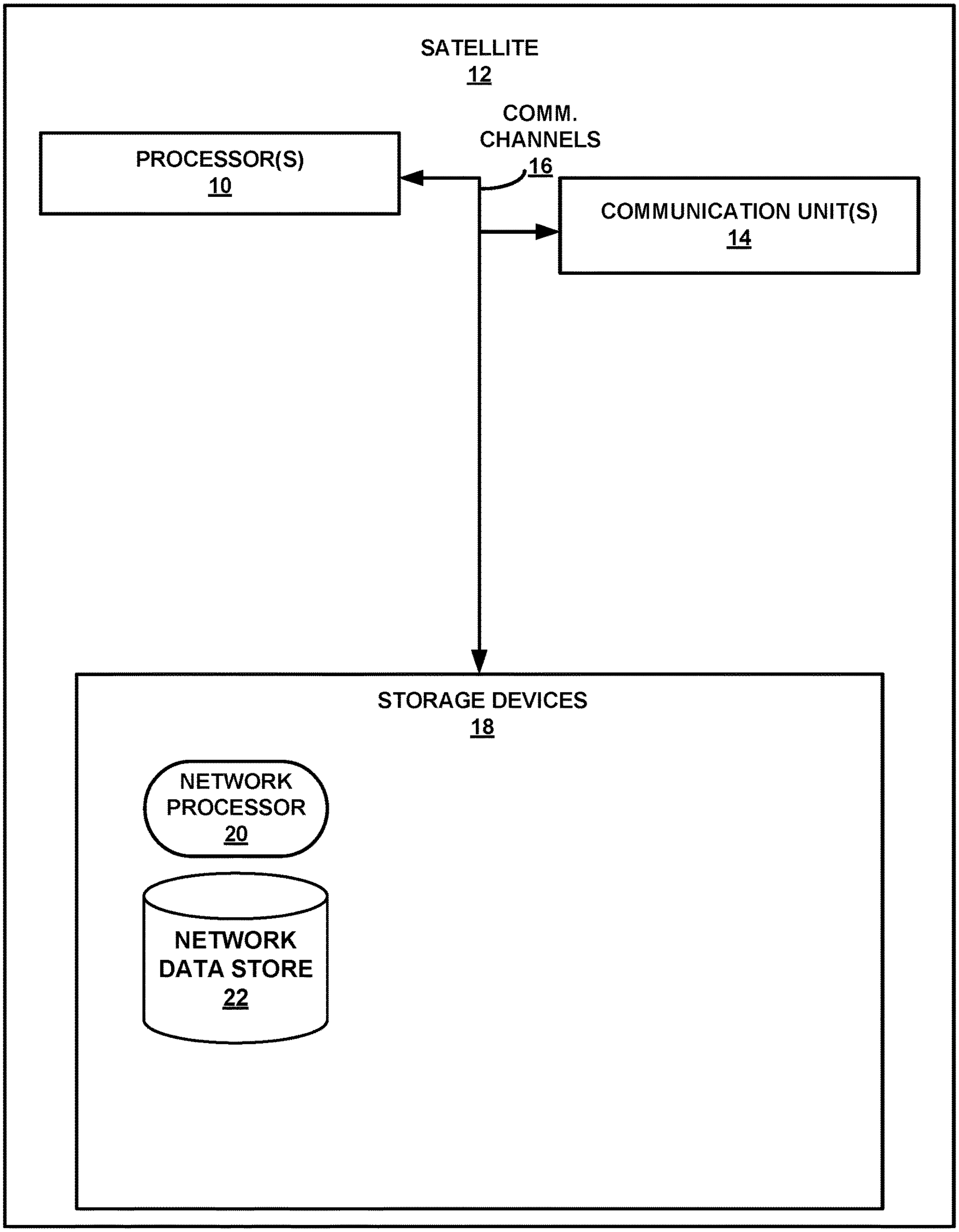
FIG. 3 is a block diagram illustrating an example satellite of satellites of FIGS. 1 and 2, in accordance with aspects of this disclosure.

FIG. 3 is a block diagram illustrating an example satellite 12 of satellites 4 of FIGS. 1 and 2, in accordance with aspects of this disclosure. FIG. 3 illustrates only one particular example of satellite 12, and many other examples of satellite 12 may be used in other instances and may include a subset of the components included in example satellite 12 or may include additional components not shown in FIG. 3.

As shown in the example of FIG. 3, satellite 12 includes one or more processors 10, one or more communication units 14, and one or more storage devices 18. One or more storage devices 18 of satellite 12 may include network processor 20 and network data store 22. Communication channels 16 may interconnect each of one or more processors 10, one or more communication units 14, and one or more storage devices 18 for inter-component communications (physically, communicatively, and/or operatively). In some examples, communication channels 16 may include a system bus, a network connection, one or more inter-process communication data structures, or any other components for communicating data between hardware and/or software.

One or more processors 10 may implement functionality and/or execute instructions within satellite 12. For example, processors 10 on satellite 12 may receive and execute instructions stored by storage devices 18 that provide the functionality of network processor 20. These instructions executed by processors 10 may cause satellite 12 to store and/or modify information, within storage devices 18 during program execution. Processors 10 may execute instructions of network processor 20 to perform one or more operations. That is, network processor 20 may be operable by processors 10 to perform various functions described herein.

One or more communication units 14 of satellite 12 may communicate with external devices, such as ground stations and neighboring satellites, by transmitting and/or receiving data. For example, satellite 12 may use one or more communication units 14 to transmit and/or receive radio signals on a radio network, transmit and/or receive satellite signals on a satellite network, transmit and/or receive optical signals, and the like. Examples of one or more communication units 14 include a network interface card (e.g. such as an Ethernet card), an optical transceiver, a radio frequency transceiver, laser transceiver, and/or any other type of device that can send and/or receive signals for inter-satellite communication or ground-to-satellite or satellite-to-ground communication. For example, one or more communication units may include four communication ports (e.g., eth0, eth1, eth2, and eth3) for communicating with two in-plane neighboring satellites and two cross-plane neighboring satellites.

One or more storage devices 18 within satellite 12 may store information for processing during operation of satellite 12. In some examples, storage device 18 is a temporary memory, meaning that a primary purpose of storage device 18 is not long-term storage. Storage devices 18 on satellite 12 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 18, in some examples, also include one or more computer-readable storage media. Storage devices 18 may be configured to store larger amounts of information than volatile memory. Storage devices 18 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 18 may store program instructions and/or data associated with network processor 20 and network data store 22.

In accordance with techniques of the disclosure, satellite 12 may include one or more processors 10 that are configured to execute network processor 20 to perform orbit-aware routing. That is, one or more processors 10 may execute network processor 20 to enable satellite 12 to intelligently route data to a neighboring satellite or to a destination ground station without relying on communicating with ground stations.

One or more processors 10 may be configured to execute network processor 20 to, in response to satellite 12 receiving a data packet from another satellite or from a ground station via one or more communication units 14, route the data packet to a neighboring satellite or to a ground station. In some examples, satellites and ground stations may send and receive data via data packets. The data packets may conform to ethernet frames, transmission control protocol (TCP), user datagram protocol (UDP), internet protocol (IP), other suitable level 2 (L2) and level 3 (L3) protocols, other suitable communication protocols, or a combination thereof. For example, a data packet may include an ethernet frame header along with a UDP payload or a TCP/IP payload.

In some examples, a data packet may specify one or more of: a source media access control (MAC) address, a destination MAC address, a source IP address, a source port, a destination IP address, and a destination IP address. The source IP address, and the source port may be the IP address and port of the originating ground station that sent the data packet to satellites 4 for routing to a destination ground station, and the destination IP address and the destination port may be the IP address and port of the destination ground station. A data packet transmitted by an originating ground station to satellite 12 may specify a source MAC address that indicates a best guess estimate of the location (orbit plane, ordinal) of the final destination of the data packet, and may also include a continuous portion that identifies the type of traffic being routed (e.g., user data, directory services, administrative data, etc.). The location and size of each of these elements in the MAC address may be specified in network processor 20's configuration file.

Each satellite of satellites 4, including satellite 12, may be associated with a MAC address. Thus, a data packet transmitted by another satellite to satellite 12 may specify a source MAC address as the MAC address of the satellite that forwarded the data packet and may specify a destination MAC address as the MAC address of a final destination satellite for the data packet. For example, a destination MAC address may have the following example encoding: 02:00:08:<orbital plane>:<ordinal>:<reserved>. Thus, the destination MAC address may, in some examples, specify the orbital plane and the ordinal within that orbital plane of the final destination satellite. Similarly, in some examples, a source MAC address may be similarly encoded, but may instead specify the orbital plane and the ordinal of the satellite sending the data packet, which may be used to, for example, determine a return path for the data packet.

When satellite 12 receives a data packet, one or more processors 10 may be configured to execute network processor 20 to perform one or more checks on the received data packet. For example, satellite 12 may determine whether the data packet specifies valid source and destination IP addresses, whether the timestamp of the data packet is within a valid range, and the like. If network processor 20 determines that the data packet does not pass the one or more checks, network processor 20 may drop the data packet.

If the data packet passes the checks, one or more processors 10 may be configured to execute network processor 20 to determine whether the data packet is a packet associated with a flow of data packets ("a packet flow") that has already been encountered by satellite 12. If satellite 12 has previously encountered other data packets associated with the same packet flow, network processor 20 may use the flow rules associated with the packet flow stored in network data store 22 to determine how to process and route the data packet. However, if the data packet associated with a packet flow is the first data packet associated with the data flow encountered by network processor 20, there may be no flow rule associated with the packet flow that can be used by network processor 20 to determine how to process and route the data packet.

To determine whether the data packet received by satellite 12 is associated with a packet flow that has been previously encountered by satellite 12, one or more processors 10 may be configured to execute network processor 20 to index into a flow table in network data store 22 using the source port and the destination IP address specified by the data packet. If flow rules associated with the source port and the destination IP address exists in the flow table, then network processor 20 may determine that the data packet is associated with a packet flow that has been previously encountered by satellite 12. Conversely, if flow rules associated with the source port and the destination IP address do not exist in the flow table, then network processor 20 may determine that the data packet is associated with a new packet flow that has not been previously encountered by satellite 12.

One or more processors 10 may be configured to execute network processor 20 to, in response to a data packet of a new packet flow that has not been previously encountered by satellite 12, determine whether satellite 12 is the final destination node for the data packet. A satellite is a final destination node for the data packet if it is the satellite that transmits the data packet to the destination ground station. If the data packet received by satellite 12 from another satellite specifies a destination MAC address, the destination MAC address specified by the data packet may be the MAC address of the final destination node. Thus, if network processor 20 determines that the MAC address of satellite 12 matches the destination MAC address specified by the data packet, network processor 20 may determine that satellite 12 is the final destination node for the data packet and may transmit the data packet to the destination ground station.

If the data packet does not specify a destination MAC address, such as when satellite 12 receives the data packet from a ground station, such as when satellite 12 receives the data packet from a ground station, one or more processors 10 may be configured to execute network processor 20 to determine the MAC address of the final destination node. In some examples, network data store 22 may store information regarding each satellite in a satellite constellation (e.g., satellites 4) that includes satellite 12. Network processor 20 may determine, based on the best estimate of the ordinal and the orbital plane of the final destination node, the MAC address of the final destination node. For example, network data store 22 may store, for each satellite in the satellite constellation, the MAC address of the satellite, the orbital plane of the satellite, the ordinal of the satellite, and the like. Thus, network processor 20 may determine, based on the information stored in network data store 22, the final destination node to be the satellite having an associated orbital plane and ordinal that most closely matches the best estimate of the ordinal and the orbital plane of the final destination node specified in the source MAC address of the data packet. If network processor 20 determines that the MAC address of satellite 12 matches the MAC address of the final destination node, network processor 20 may determine that satellite 12 is the final destination node for the data packet and may transmit the data packet to the destination ground station.

If network processor 20 determines that satellite 12 is not the final destination node, one or more processors 10 may be configured to execute network processor 20 to determine whether the orbital plane of satellite 12 is the same as the final destination plane. To determine whether the orbital plane of satellite 12 is the same as the final destination plane, network processor 20 may look up the orbital plane of the final destination node as stored in network data store 22 and compare the orbital plane of the final destination node as stored in network data store 22 with the orbital plane of satellite 12. If the orbital plane of satellite 12 is the same as the final destination plane, satellite 12 may forward the data packet to an in-plane neighboring satellite towards the final destination node. However, if the orbital plane of satellite 12 is not the same as the final destination plane, satellite 12 may potentially have to forward the data packet to a cross-plane neighboring satellite in order for the data packet to reach the final destination node.

If network processor 20 determines that the orbital plane of satellite 12 is the same as the final destination plane, network processor 20 may forward the data packet to an in-plane neighboring satellite. One or more processors 10 may be configured to execute network processor 20 to determine which in-plane neighboring satellite to which the data packet should be forwarded. In general, satellite 12 may have two in-plane neighboring satellites in opposite directions with which satellite 12 can communicate to forward the data packet, and network processor 20 may select the in-plane neighboring satellites to which the data packet is forwarded based on minimizing the number of hops to the final destination node.

Given that network processor 20 has determined the MAC address of the final destination node, network processor 20 can look up, in network data store 22, the ordinal of the final destination node in the orbital plane. Network processor 20 can compare the ordinal of the final destination node in the orbital plane with the ordinal of satellite 12 to determine which of the two in-plane neighboring satellites with which satellite 12 can communicate would provide a shorter path to the final destination node. Network processor 20 may therefore select the in-plane neighboring satellite to which the data packet is to be forwarded and may forward, via the one or more communication units 14, the data packet to the selected in-plane neighboring satellite.

If network processor 20 determines that the orbital plane of satellite 12 is not the same as the final destination plane, network processor 20 may determine whether satellite 12 is able to forward the data packet to a cross-plane neighboring satellite. As discussed with respect to FIG. 2, a satellite may not necessarily be able to establish communication links with cross-plane neighboring satellites if the satellite is near a pole (e.g., the north pole or the south pole) of the Earth or if the satellite 12 is near the equator).

In some examples, network processor 20 may also determine whether communication links with cross-plane neighboring satellites are up by periodically sending and receiving neighbor status data to and from neighboring satellites. For example, satellite 12 may periodically send information regarding the status of its communication ports (e.g., ports in one or more communication units 14 that establishes links with neighboring satellites), such as whether each of the ports are up or down, the bandwidth metrics of each of the ports, and the like, to its neighboring satellites. Similarly, satellite 12 may receive, from neighboring satellites, neighbor status data that includes similar information regarding ports of each of the neighboring satellites, as well as information regarding the ports of other non-neighboring satellites in satellites 4.

Network processor 20 may store such neighbor status data received from neighboring satellites as well as the data regarding satellite 12's own ports in network data store 22 to build a topology of satellites 4 which may indicate which communication links between satellites are down, the bandwidth metrics of each of the links in satellite 4, and the like. Such a topology may enable network processor 20 to intelligently route data packets based on determining link status, data congestion, bandwidth availability, and the like.

In some examples, network processor 20 may determine whether satellite 12 is located in a pre-determined region that allows communication with cross-plane neighboring satellites. If network processor 20 determines that satellite 20 is not located in a pre-determined region that allows communication with cross-plane neighboring satellites, network processor 20 may the pre-determined region that allows communication with cross-plane neighboring satellites may be a region that is below a cutoff latitude in the northern hemisphere or above a cutoff latitude in the southern hemisphere. If network processor 20 determines that satellite 12 is above the cutoff latitude in the northern hemisphere or below the cutoff latitude in the southern hemisphere, network processor 20 may determine that satellite 12 is not able to forward the data packet to a cross-plane neighboring satellite.

If network processor 20 determines that satellite 12 is not able to forward the data packet to a cross-plane neighboring satellite, network processor 20 may select an in-plane neighboring satellite to which the data packet is forwarded. For example, if satellite 12 is not able to establish communication links with cross-plane neighboring satellites because satellite 12 is near the north pole or the south pole, satellite 12 may select an in-plane neighboring satellite that is relatively closer to the equator as the in-plane neighboring satellite to which the data packet is forwarded. In another if satellite 12 is not able to establish communication links with cross-plane neighboring satellites because satellite 12 is near the equator, satellite 12 may select an in-plane neighboring satellite that is relatively farther away from the equator as the in-plane neighboring satellite to which the data packet is forwarded. Network processor 20 may therefore forward, via the one or more communication units 14, the data packet to the selected in-plane neighboring satellite.

If network processor 20 determines that satellite 12 is able to forward the data packet to a cross-plane neighboring satellite, network processor 20 may determine which cross-plane neighboring satellite to which the data packet is forwarded. In general, satellite 12 may be able to establish a communication link with a neighboring cross-plane satellite on each of the two neighboring orbital planes of the orbital plane of satellite 12, and satellite 12 may select the cross-plane neighboring satellite out of the two neighboring cross-plane satellites that is in a direction where no seam exists between satellite 12 and the final destination plane as the cross-plane neighboring satellite to which the data packet is forwarded. For example, network data store 22 may store an indication of a topology of the constellation of satellites that includes satellite 12, including indications of where seams exist within the topology, and network processor 20 may use such a topology to determine the cross-plane direction to the final destination plane that does not have a seam. Network processor 20 may therefore forward, via the one or more communication units 14, the data packet to the selected cross-plane neighboring satellite.

In some examples, network processor 20 may use congestion routing to determine which neighboring satellite to which the data packet is forwarded based at least in part on. Satellite 12 may communicate with its neighboring satellites (e.g., two cross-plane neighboring satellites and two in-plane neighboring satellites of satellite 12) to receive, from each of the neighboring satellites, information such as the availability of the link between satellite 12 and the neighboring satellite, the amount of bandwidth being utilized by the neighboring satellite to transfer data, and the like. Network processor 20 may therefore determine, based on information such as the link availability of each of the neighboring satellites and the bandwidth utilized by each of the neighboring satellites, the neighboring satellite to which data is forwarded.

For example, if network processor 20 determines that satellite 12 is in a pre-determined region that allows communication with cross-plane neighboring satellites, network processor 20 may determine whether the link between satellite 12 and the cross-plane neighboring satellite in the cross-plane direction to the final destination plane that does not have a seam is available. If network processor 20 determines that the link between satellite 12 and the cross-plane neighboring satellite in the cross-plane direction to the final destination plane that does not have a seam is not available, network processor 20 may forward, via the one or more communication units 14, the data packet to an in-plane neighboring satellite instead of a cross-plane neighboring satellite. In some examples, a link between satellite 12 and a neighboring satellite may not be available because the neighboring satellite is already reserved by other missions and/or other data traffic, because satellite 12 and a neighboring satellite are unable to communicate with each other, such as due to hardware malfunction, and the like.

If network processor 20 determines that the link between satellite 12 and the cross-plane neighboring satellite in the cross-plane direction to the final destination plane that does not have a seam is available, network processor 20 may determine, based on the information regarding the amount of bandwidth being utilized by the cross-plane neighboring satellite to transfer data, whether the cross-plane neighboring satellite has the available bandwidth to receive the data packet from satellite 12. For example, network processor 20 may determine whether the amount of bandwidth being utilized by the cross-plane neighboring satellite to transfer data is greater than or equal to a traffic threshold, which may correspond to the amount of bandwidth usage at which the cross-plane neighboring satellite is considered to be congested. If network processor 20 determines that the amount of bandwidth being utilized by the cross-plane neighboring satellite to transfer data is greater than or equal to a traffic threshold, network processor 20 may determine that the cross-plane neighboring satellite does not have the available bandwidth to receive the data packet from satellite 12, and may instead forward, via the one or more communication units 14, the data packet to an in-plane neighboring satellite instead of the cross-plane neighboring satellite.

Similarly, if network processor 20 determines that satellite 12 is not able to forward the data packet to a cross-plane neighboring satellite, network processor 20, may determine which one of the two in-plane neighboring satellites to which the data packet is forwarded. If network processor 20 determines that the link between satellite 12 to one of the two in-plane neighboring satellites is not available, then network processor 20 may forward the data packet to the other one of the two in-plane satellites.

In some examples, network processor 20 may determine which one of the two in-plane neighboring satellites to which the data packet is forwarded based on whether the two in-plane neighboring satellites have the available bandwidth to receive the data packet from satellite 12. As described above, network processor 20 may receive, from each of the two in-plane neighboring satellites, regarding the amount of bandwidth being utilized by the in-plane neighboring satellite. If network processor 20 determines that the amount of bandwidth being utilized by a first of the two in-plane neighboring satellite to transfer data is greater than or equal to a traffic threshold, and that the amount of bandwidth being utilized by a second of the two in-plane neighboring satellite to transfer data is less than the traffic threshold, network processor 20 may forward, via the one or more communication units 14, the data packet to the second in-plane neighboring satellite instead of the first in-plane neighboring satellite.

Prior to forwarding the data packet to the selected neighboring satellite, one or more processors 10 may be configured to execute network processor 20 to update the data packet. Specifically, network processor 20 may update the data packet to specify the source MAC address as the MAC address of satellite 12 and may update the data packet to specify the destination MAC address to the MAC address of the final destination node.

If the data packet is the first data packet of a packet flow encountered by satellite 12, one or more processors 10 may be configured to execute network processor 20 to create flow rules for the packet flow, and store the flow rules in network data store 22, where the flow rules are associated with the source port and the destination IP address specified by the data packet. Network processor 20 may create, for the packet flow, a flow rule to update the data packet to specify the source MAC address as the MAC address of satellite 12. Network processor 20 may also create, for the packet flow, a flow rule to update the data packet to specify the destination MAC address to 1) the MAC address of the final destination node if the data packet is forwarded to a neighboring satellite or to 2) the destination ground station's MAC address if the data packet is forwarded to the destination ground station. Network processor 20 may create, for the packet flow, a flow rule to forward data packets of the packet flow to the selected neighboring satellite or, if satellite 12 forwards the data packet to the destination ground station, a flow rule to forward the data packets of the data flow to the destination ground station.

The following pseudocode is an example description of the operations of network processor 20 to receive and forward data packets:

Orbit Aware Routing (OAR)—basic routing pseudocode

The two primary code paths that comprise the basic OAR traffic routing algorithm are the receipt of a user traffic packet (data packet) and notification of a down port.

OAR user traffic routing begins with the receipt of a user traffic packet:

```
IF packet received from primary-link switch port THEN
    Decode IP header
    Assert source user IP address to EL cache
    Look up destination IP address from EL cache
    IF destination user is off-line THEN
        Send ICMP unreachable back on primary switch port
        Drop packet and RETURN
    ELSE IF destination user location is unknown (pending state) THEN
        Drop packet and RETURN
    ELSE IF destination node is current node THEN
        CALL ForwardToPrimary with packet
    ELSE // Route packet to another node
        CALL NextHopSwitchPort with destination node RETURNING
switch port
        IF switch port is valid THEN
            WITH controller packet
                Modify source MAC to be current node MAC identifier
                Modify destination MAC to be destination node MAC
identifier
                Set packet TTL to maximum value
            ENDWITH
            IF no flow rule established THEN
                Create flow rule with packet mods to route user traffic
to cross-link switch port
            ENDIF
            Forward packet with packet mods to cross-link switch port
        ENDIF
    ENDIF
  // Packet received from cross-link switch port
  ELSE
    Decode destination node location from destination MAC address
    CALL NextHopSwitchPort with destination node RETURNING switch port
    IF distance to destination node is "small" (currently <= 1) THEN
        Decode IP header
        Look up updated destination IP address from EL cache
        IF the updated destination is the current node THEN
            SET switch port to primary link switch port
        ELSE IF updated destination node is different from MAC destination
node THEN
            CALL NextHopSwitchPort with updated destination node
RETURNING switch port
            Store new destination MAC address
        ELSE IF destination user is off-line THEN
            Drop packet and RETURN
        ENDIF
        Include the destination user IP address in the flow rule
    ENDIF
    IF switch port is primary link switch port THEN
        CALL ForwardToPrimary with packet
    ELSE IF switch port is valid THEN
        WITH controller packet
            Decrement packet TTL value
            New destination MAC address (optional)
            Select by destination user IP address (optional; not strictly a
packet mod)
        ENDWITH
        IF no flow rule established THEN
            Create flow rule with packet mods to send user traffic to cross-
link switch port
        ENDIF
        Forward packet with packet mods to cross-link switch port
    ENDIF
  ENDIF
OAR receives notification of a down switch port:
  IF the switch port is for a cross link THEN
    FOR all flow rules associated with the downed link
        Remove flow rule
    ENDFOR
  ENDIF
SUB ForwardToPrimary (packet)
  WITH controller packet
    Modify source MAC to be (constellation-computed) remote-user MAC
    Modify destination MAC to be correct destination user's MAC
    Set packet TTL to fixed value to mask traversal count
  ENDWITH
  IF no flow rule established THEN
    Create flow rule with packet mods to send user traffic back to primary link
  ENDIF
  Forward packet with packet mods to primary link
ENDSUB
SUB NextHopSwitchPort (destination node) RETURNS switch port
```

-continued

```
  SET switch port to invalid
  IF destination plane is less than current plane THEN
    IF is ascending THEN
      CALL GetSwitchPort with left RETURNING switch port
    ELSE
      CALL GetSwitchPort with right RETURNING switch port
    ENDIF
    Remember that we tried "lower" plane side
  ELSE IF destination plane is greater than current plane THEN
    IF is ascending THEN
      CALL GetSwitchPort with left RETURNING switch port
    ELSE
      CALL GetSwitchPort with left RETURNING switch port
    ENDIF
    Remember that we tried "higher" plane side
  ENDIF
  // Either we cannot go left or right, or we do not want to
  IF switch port is invalid THEN
    IF destination node is current node THEN
      SET switch port to primary-link switch port
    ELSE IF tried cross-plane AND in pendulum-avoidance region THEN
      IF shortest path to the equator is in the aft direction THEN
        CALL GetSwitchPort with aft RETURNING switch port
      ELSE
        CALL GetSwitchPort with forward RETURNING switch port
      ENDIF
    ENDIF
  ENDIF
  // In-plane choice of direction if we still don't have a valid next-hop port
  IF switch port is invalid THEN
    IF going forward gets us closer to destination ordinal THEN
      CALL GetSwitchPort with forward RETURNING switch port
      Remember that we tried forward
      IF switch port is invalid AND the difference is less than three hops
THEN
        CALL GetSwitchPort with aft RETURNING switch port
      ENDIF
    ELSE
      CALL GetSwitchPort with aft RETURNING switch port
      Remember that we tried aft
      IF switch port is invalid AND the difference is less than three hops
THEN
        CALL GetSwitchPort with forward RETURNING switch port
      ENDIF
    ENDIF
  ENDIF
  IF switch port is invalid AND we did not try "lower" plane AND we tried "aft"
THEN
    CALL GetSwitchPort with left RETURNING switch port
  ENDIF
  IF switch port is invalid AND we did not try "higher" plane AND we tried "forward"
THEN
    CALL GetSwitchPort with right RETURNING switch port
  ENDIF
  // Last-ditch effort to find a route off the node
  IF switch port is invalid THEN
    CALL GetSwitchPort with forward RETURNING switch port
  ENDIF
  IF switch port is invalid THEN
    CALL GetSwitchPort with aft RETURNING switch port
  ENDIF
  IF switch port is invalid THEN
    CALL GetSwitchPort with left RETURNING switch port
  ENDIF
  IF switch port is invalid THEN
    CALL GetSwitchPort with right RETURNING switch port
  ENDIF
  RETURN switch port
ENDSUB
SUB GetSwitchPort (direction) RETURNS switch port
  SET switch port to invalid
  IF direction is forward THEN
    SET switch port to forward switch port
  ELSE IF direction is aft THEN
    SET switch port to aft switch port
  ELSE IF direction is left THEN
    IF is ascending THEN
      SET switch port to left-ascending switch port
    ELSE
```

-continued

```
        SET switch port to left-descending switch port
    ENDIF
  ELSE IF direction is right THEN
    IF is ascending THEN
        SET switch port to right-ascending switch port
    ELSE
        SET switch port to right-descending switch port
    ENDIF
  ENDIF
  IF switch port is not (hardware and neighborly) up THEN
    SET switch port to invalid
  ELSE IF switch port is the source of the packet THEN
    SET switch port to invalid
  ENDIF
  RETURN switch port
ENDSUB
LocalWords: ENDFOR ENDIF ENDSUB ENDWITH ForwardToPrimary
NextHopSwitchPort GetSwitchPort
;; Local Variables:
;; tab-width: 4
;; End:
```

The following pseudocode is an example description of the operations of network processor 20 to receive status information for all the nodes in satellites 4 for which satellite 12 can receive status information from its neighboring satellites, and to send status information regarding satellite 12 to its neighboring satellites:

Orbit Aware Routing (OAR)—Neighbor Status (NS) pseudocode

On startup, the OAR NS module creates and initializes a node data table containing node information for all the nodes for which it can receive status information from its neighbors. A configuration element indicates the number of planes (currently one) of information NS will transmit in each status message. The number of planes in the node data table will thus be at most the number of transmitted planes plus two (by receiving status packets from the left and right cross-plane neighbors, limited by the seams).

There are three main code flows in OAR-NS: (continuously running) worker thread, port status event (port transition), and received NS packet event.

```
Worker thread:
  WHILE true
      Sleep for send interval
      CALL SendPacket with all ports
  ENDWHILE
Port status event:
  IF switch port is a cross-link AND
    is hardware-up AND
    is not neighborly-up THEN
      CALL SendPacket with switch port
  ENDIF
Received NS packet event:
  Decode and validate status message header (e.g., valid protocol version, non-zero
time and size quantities, plane/ordinal ranges)
  IF decoded header is valid THEN
      LOCK mutex on NS data
      IF message timestamp is greater than current time THEN
        IF the difference is greater than the send interval THEN
          Skip this message; clock synchronization is too far gone.
        ELSE IF the difference is greater than configurable threshold THEN
          Issue clock drift diagnostic
        ENDIF
        Override message timestamp with current time
      ELSE IF the message timestamp is behind the current time by more than the
send interval THEN
        Skip this message; it is too tardy
      ELSE
        FOR all nodes in message's node data
          Find and update corresponding node status in node data table
        ENDFOR
      ENDIF
      CALL Neighborly with switch port RETURNING neighborly up/down state
      UNLOCK mutex on NS data
      Update the directly-connected-neighbor switch port status neighborly
```

-continued

```
up/down state
  ENDIF
SUB SendPacket (switch port select)
  Get system interface data on cross-links
  LOCK mutex on NS data
  FOR each cross-link switch port
      Update local switch port status bandwidth metrics from interface data
      Transfer local switch port status bandwidth metrics to the "self" portion of
node data table
      CALL Neighborly with switch port RETURNING neighborly up/down state
  ENDFOR
  // Note: We only increment the sequence number for the "broadcast"
  // (worker thread) sends. Port selected sends (on hardware-up
  // transitions) are "catch-up" messages using last sequence number.
  IF switch port select is all THEN
      Increment NS message sequence number counter
  ENDIF
  Encode status message header
  FOR all nodes in configuration selected portion of node data table
      Encode node data
  ENDFOR
  UNLOCK mutex on NS data
  FOR each cross-link switch port
      Set switch port neighborly up/down state
  ENDFOR
  IF switch port select is not all THEN
      Send UDP NS packet to switch port select
  ELSE
      Send UDP NS packet to switch port fore
      Send UDP NS packet to switch port aft
      Send UDP NS packet to switch port (ascending/descending) left
      Send UDP NS packet to switch port (ascending/descending) right
  ENDIF
ENDSUB
SUB Neighborly (switch port) RETURNS boolean
  IF the switch port's peer port status node (in the node data table) has seen this node's
status AND
     the link is hardware-up THEN
      return TRUE
  ELSE
      return FALSE
  ENDIF
ENDSUB
;; Local Variables:
;; tab-width: 4
;; End:
```

Figure 4A:
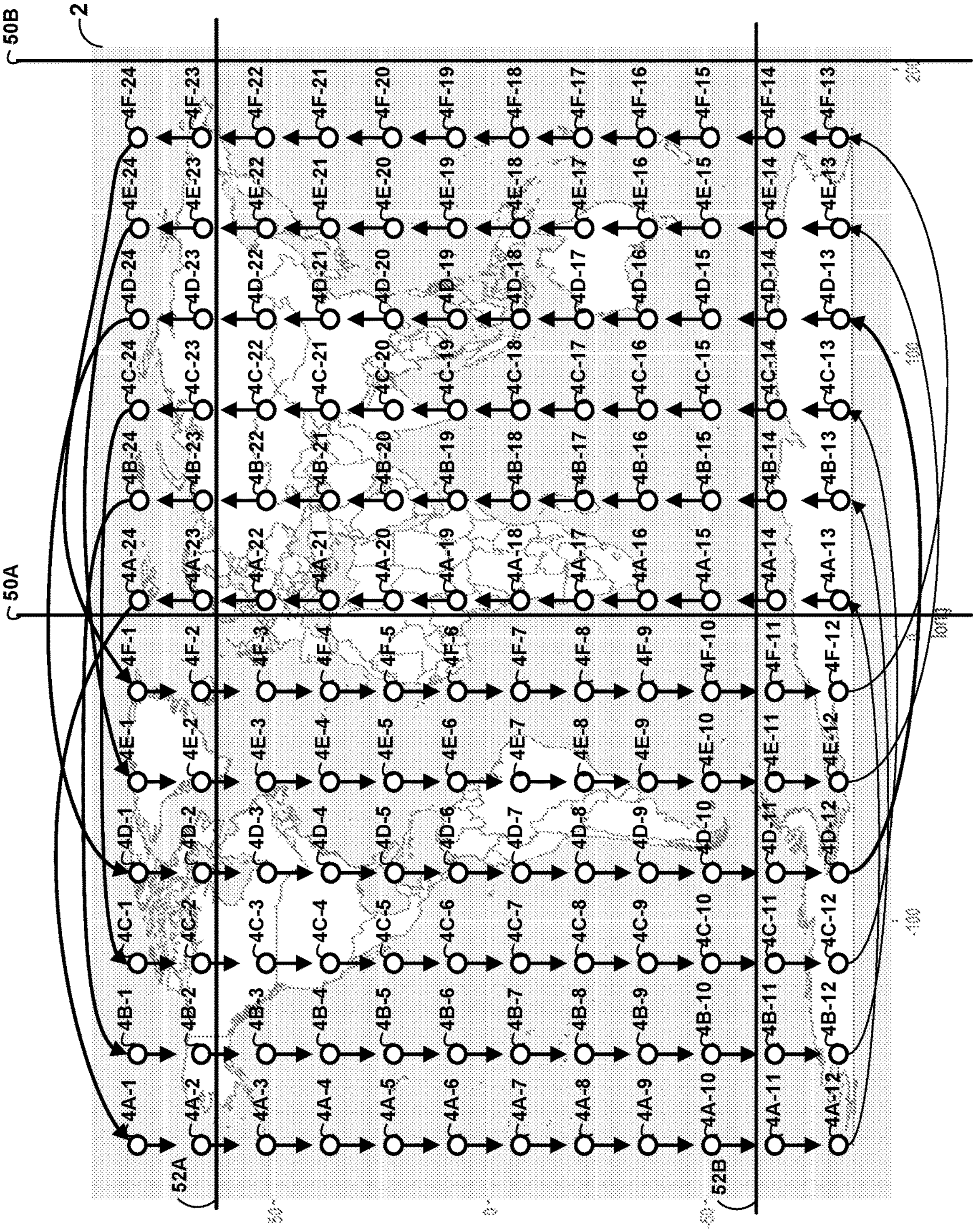
FIG. 4A-4D are block diagrams illustrating examples of orbit-aware routing performed by satellites of FIGS. 1 and 2, in accordance with aspects of this disclosure.

FIG. 4A-4D are block diagrams illustrating examples of orbit-aware routing performed by satellites 4, in accordance with aspects of this disclosure. As can be seen in FIGS. 4A-4D, the Earth 2 is projected into two dimensions in order to illustrate the orbital planes of satellites 4 around the Earth 2. In the examples of FIGS. 4A-4D, each orbital plane of satellites 4 may include 24 satellites 4. For example, a first orbital plane includes satellites 4A-1 to 4A-24, a second orbital plane includes satellites 4B-1 to 4B-24, a third orbital plane includes satellites 4C-1 to 4C-24, a fourth orbital plane includes satellites 4D-1 to 4D-24, a fifth orbital plane includes satellites 4E-1 to 4E-24, and a sixth orbital plane includes satellites 4F-1 to 4F-24, As shown in FIG. 4A, due to the orbital motion of satellites 4 around the Earth 2, a satellite in an orbital plane may travel in a northernly direction until it crosses the north pole, upon which the satellite may travel in a southernly direction until it crosses the south pole, upon which the satellite may travel in a northernly direction, and so on, thereby orbiting the Earth 2. Seams 50A and 50B denote locations between two sets of cross-plane neighboring satellites traveling in different directions. For example, seam 50A denotes a location between satellites 4F-1 to 4F-12 traveling in a southernly direction and satellites 4A-13 to 4A-24 traveling in a northernly direction. Similarly, seam 50B denotes a location between satellites 4A-1 to 4A-12 traveling in a southernly direction and satellites 4F-13 to 4F-24 traveling in a northernly direction.

A satellite may not be able to communicate with a cross-plane neighboring satellite across a seam, as it may be difficult to establish a reliable communication link between satellites traveling in different directions. Thus, for example, even though satellite 4A-23 is a cross-plane neighboring satellite of satellite 4F-2, satellites 4A-23 and 4F-2 may not be able to communicate with each other because seam 50A lies between satellites 4A-23 and 4F-2.

A satellite may also not be able to communicate with a cross-plane neighboring satellite if the satellite is above a cutoff latitude 52A in the northern hemisphere or if the satellite is below a cutoff latitude 52B in the southern hemisphere. For example, satellite 4E-2 may not be able to communicate with cross-plane neighboring satellites 4F-2 or 4D-2 because satellite 4E-2 is located above cutoff latitude 52A in the northern hemisphere. Similarly, satellite 4D-14 may not be able to communicate with cross-plane neighboring satellites 4E-14 or 4C-14 because satellite 4D-14 is located below cutoff latitude 52B in the southern hemisphere.

A ground station on Earth 2 may use satellites 4 to route data to another ground station on Earth 2. As shown in FIG.

4B, ground station 8A in Australia may use satellites 4 to transmit data to ground station 8B on the east coast of the United States. To use satellites 4 to transmit data to ground station 8B, ground station 8A may transmit data to satellite 4E-17, which may be the satellite to which ground station 8A has a line of sight view.

In some examples, a ground station may transmit data in the form of data packets via any suitable data transmission protocols, such as UDP, TCP, and the like. For example, a data packet may be an Ethernet frame that encapsulates a UDP/IP packet or a TCP/IP packet.

Figure 4B:
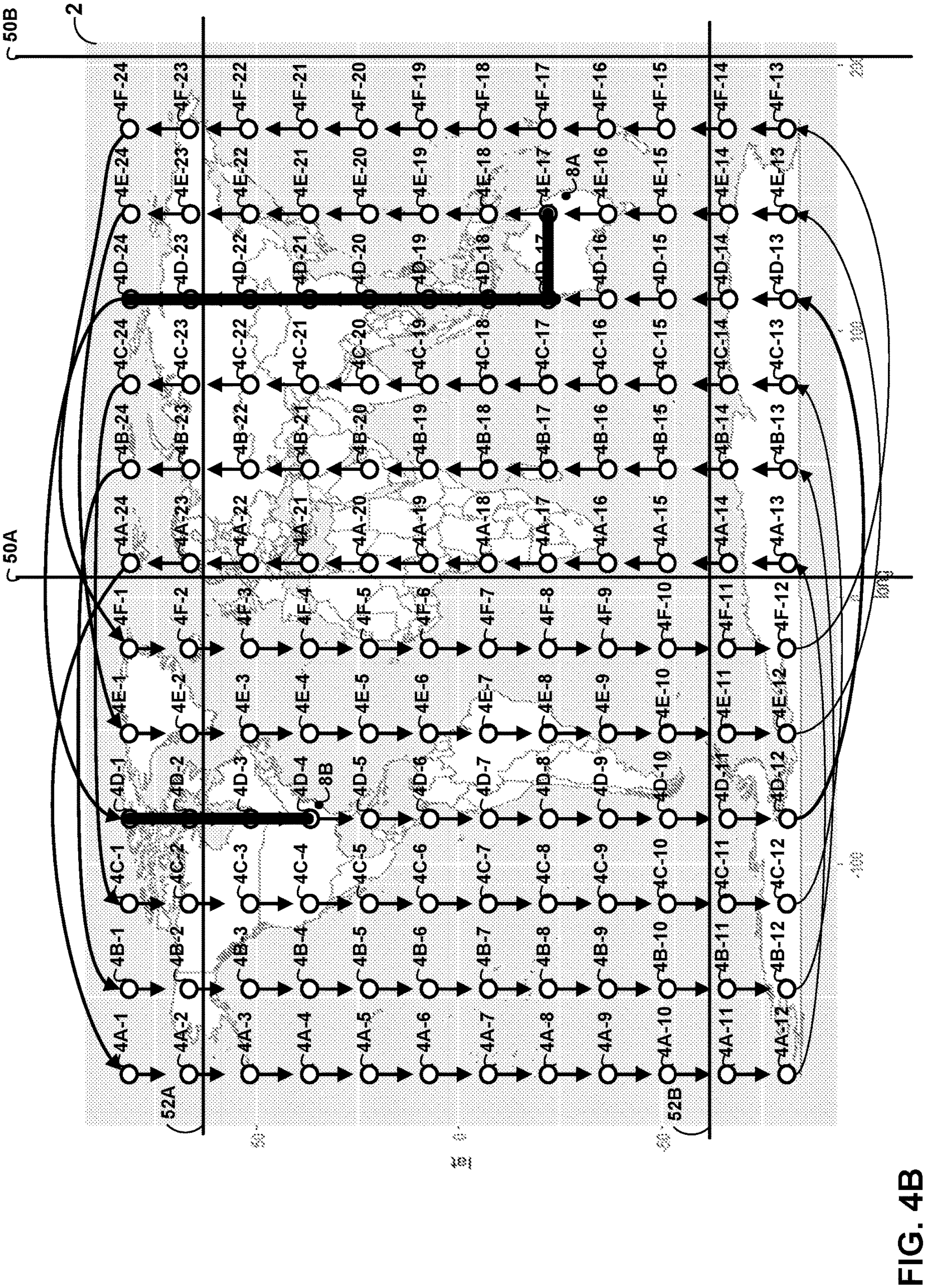

Satellite 4E-17 may, after receiving a first data packet from ground station 8A, determine the final destination satellite of the data packet. That is, satellite 4E-17 may determine the satellite that is to transmit the data packet to destination ground station 8B. Satellite 4E-17 may determine, based on the destination MAC address and/or the destination IP address and destination port specified by the data packet, the final destination satellite of the data packet. In the example of FIG. 4B, satellite 4E-17 may determine satellite 4D-4 as the final destination satellite of the data packet.

Satellite 4E-17 may determine the final destination plane of the data packet as the ordinal plane of the final destination satellite 4D-4 of the data packet. For example, satellite 4E-17 may look up the ordinal plane of final destination satellite 4D-4 using one or more tables stored in satellite 4E-17 that stores the associated ordinal planes and ordinals of each of satellites 4 to determine the orbital plane for satellites 4D-1 to 4D-17 as the final destination plane.

Satellite 4E-17 may determine whether the final destination plane of the data packet is different from the ordinal plane of satellite 4E-17. If satellite 4E-17 determines that the final destination plane of the data packet is the same as the ordinal plane of satellite 4E-17, satellite 4E-17 may forward the data packet to an in-plane neighboring satellite in the direction that minimizes the number of hops to the final destination satellite.

If satellite 4E-17 determines that the final destination plane of the data packet is different from the ordinal plane of satellite 4E-17, satellite 4E-17 may determine whether satellite 4E-17 is able to forward the packet to a cross-plane neighboring satellite. Satellite 4E-17 may not be able to forward the packet to a cross-plane neighboring satellite, for example, if there is a problem with the link between satellite 4E-17 and cross-plane neighboring satellites or if satellite 4E-17 is above cutoff latitude 52A or below cutoff latitude 52B.

Because the final destination plane of the data packet is different from the ordinal plane of satellite 4E-17, satellite 4E-17 may determine whether it is able to forward the packet to a cross-plane neighboring satellite. Because satellite 4E-17 is not above cutoff latitude 52A or below cutoff latitude 52B, and because there are no problems with the link between satellite 4E-17 and cross-plane neighboring satellites, satellite 4E-17 may determine to forward the data packet to a cross-plane neighboring satellite.

If satellite 4E-17 determines to forward the data packet to a cross-plane neighboring satellite, satellite 4E-17 may determine the cross-plane direction to forward the data packet towards the final destination plane. As can be seen in FIG. 4A, satellite 4E-17 may be able to forward the data packet in two opposite cross-plane directions: east to satellite 4D-17 or west to satellite 4F-17 towards the final destination plane. Satellite 4E-17 may determine the cross-plane direction to forward the data packet as the direction where there is not a seam, such as seam 50A or seam 50B, between satellite 4E-17 and the final destination plane. Because the eastern cross-plane direction from satellite 4E-17 to the final destination plane crosses seam 50B, satellite 4E-17 may determine to forward the data packet to the western cross-plane neighboring satellite 4D-17.

Satellite 4E-17 may update the data packet to specify the source MAC address of the data packet as the MAC address of satellite 4E-17. Satellite 4E-17 may also update the data packet to specify the destination MAC address of the data packet to the MAC address of final destination satellite 4D-4. If the data packet received by satellite 4E-17 is a first packet of a packet flow received by satellite 4E-17, the data packet may create a new flow rule for the packet flow associated with the source port and the destination IP address to, for each subsequently received data packet of the packet flow, update the data packet to specify the source MAC address of the data packet as the MAC address of satellite 4E-17, update the data packet to specify the destination MAC address of the data packet to the MAC address of final destination satellite 4D-4, and to specify that data packets of the data flow are to be forwarded to satellite 4D-17.

Satellite 4E-17 may therefore forward the data packet to satellite 4D-17. As satellite 4E-17 encounters subsequent data packets of the same packet flow, satellite 4E-17 may also follow the flow rule for the packet flow to update the source and destination MAC addresses of those data packets and forward the data packets to satellite 4D-17.

Satellite 4D-17 may, in response to receiving the data packet, determine that its ordinal plane is the same as the final destination plane. Because the ordinal plane of satellite 4D-17 is the same as the final destination plane, satellite 4D-17 may determine in which in-plane direction to forward the data packet towards the final destination satellite 4D-4 based on the number of hops to reach the final destination satellite 4D-4. Satellite 4D-17 may determine that it takes fewer hops to reach the final destination satellite 4D-4 by forwarding to a northern in-plane neighboring satellite 4D-18 and may therefore determine to forward the data packet to in-plane neighboring satellite 4D-18.

Satellite 4D-17 may update the data packet to specify the source MAC address of the data packet as the MAC address of satellite 4D-17. Satellite 4D-17 may also update the data packet to specify the destination MAC address of the data packet to the MAC address of final destination satellite 4D-4. If the data packet received by satellite 4D-17 is a first packet of a packet flow received by satellite 4D-17, the data packet may create a new flow rule for the packet flow associated with the source port and the destination IP address to, for each subsequently received data packet of the packet flow, update the data packet to specify the source MAC address of the data packet as the MAC address of satellite 4D-17, update the data packet to specify the destination MAC address of the data packet to the MAC address of final destination satellite 4D-4, and to specify that data packets of the data flow are to be forwarded to satellite 4D-18.

Satellite 4D-17 may therefore forward the data packet to satellite 4D-18. As satellite 4D-17 encounters subsequent data packets of the same packet flow, satellite 4D-17 may also follow the flow rule for the packet flow to update the source and destination MAC addresses of those data packets and forward the data packets to satellite 4D-18.

Satellite 4D-18 may, in response to receiving the data packet from satellite 4D-17, perform the techniques described with respect to satellite 4D-17 to determine to forward the data packet to satellite 4D-19, update the MAC addresses in the data packet, create a flow rule for the packet flow associated with the data packet, and forward the data packet to satellite 4D-19. As the data packet is forwarded through satellites 4D-19 to 4D-4 along the final destination plane, each of the satellites that receive the data packet may, in response to receiving the data packet, perform the techniques described with respect to satellite 4D-17 to determine the in-plane neighboring satellite to which the data packet is forwarded, update the MAC addresses in the data packet, create a flow rule for the packet flow associated with the data packet, and forward the data packet. When satellite 4D-4 receives the data packet and determines that it is the final destination satellite, satellite 4D-4 may also update the destination MAC address of the data packet to the MAC address of ground station 8B and may transmit the data packet to ground station 8B, thereby successfully routing data from ground station 8A to ground station 8B via satellites 4.

As shown in FIG. 4B, ground station 8C may use satellites 4 to route data to ground station 8B by transmitting data to satellite 4A-22. Because satellite 4A-22 is in the northern hemisphere below cutoff latitude 90A and because the orbital plane of satellite 4A-22 is not the same as the final destination orbital plane, satellite 4A-22 may transmit data received from ground station 8C to a cross-plane neighboring satellite. Because the western cross-plane direction between the orbital plane of satellite 4A-22 and the final destination plane passes through seam 50A, satellite 4A-22 may forward the data instead to the eastern cross-plane neighboring satellite 4B-22.

Because satellite 4B-22 is in the northern hemisphere below cutoff latitude 90A and because the orbital plane of satellite 4B-22 is not the same as the final destination orbital plane, satellite 4B-22 may transmit data received from satellite 4A-22 to a cross-plane neighboring satellite. Because the western cross-plane direction between the orbital plane of satellite 4B-22 and the final destination plane passes through seam 50A, satellite 4B-22 may forward the data instead to the eastern cross-plane neighboring satellite 4C-22.

Because satellite 4C-22 is in the northern hemisphere below cutoff latitude 90A and because the orbital plane of satellite 4C-22 is not the same as the final destination orbital plane, satellite 4C-22 may transmit data received from satellite 4B-22 to a cross-plane neighboring satellite. Because the western cross-plane direction between the orbital plane of satellite 4C-22 and the final destination plane passes through seam 50A, satellite 4C-22 may forward the data instead to the eastern cross-plane neighboring satellite 4D-22.

Because satellite 4D-22 is in the same orbital plane as the final destination orbital plane, satellite 4D-22 may transmit data received from satellite 4C-22 to an in-plane neighboring satellite in the direction of the final destination satellite 4D-4. Because it takes six hops for data to reach the final destination satellite 4D-4 from satellite 4D-22 by transmitting the data in a northern direction with respect to satellite 4D-4 as opposed to 18 hops by transmitting the data in a southern direction with respect to satellite 4D-4, satellite 4D-4 may forward the date to in-plane neighboring satellite 4D-23.

Satellite 4D-23 to satellite 4D-3 may continue to forward the data in-plane to reach final destination satellite 4D-4, and final destination satellite 4D-4 may forward the data to ground station 8B, thereby successfully routing data from ground station 8C to ground station 8B via satellites 4.

Figure 4C:
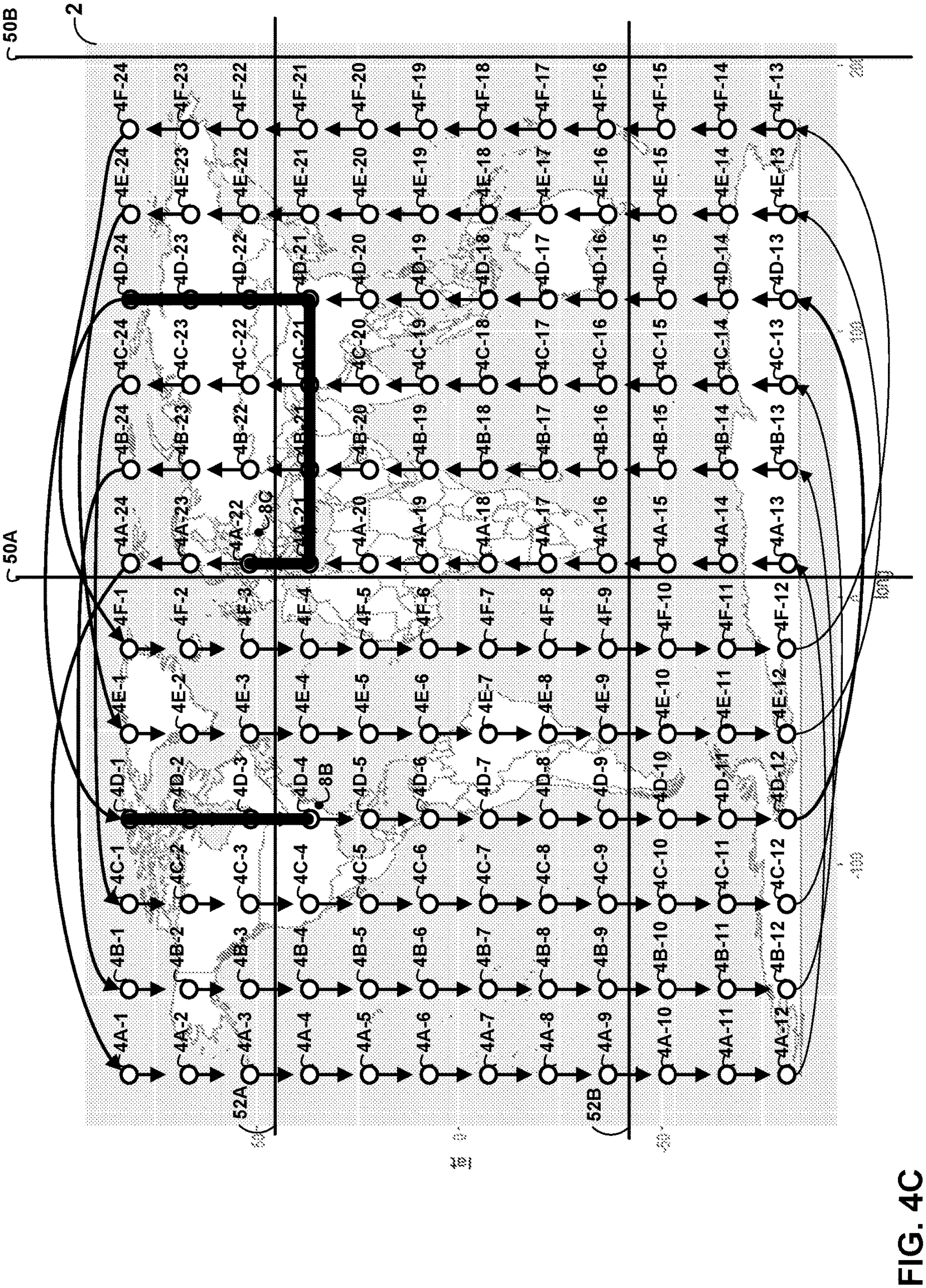

As shown in FIG. 4C, ground station 8D may use satellites 4 to route data to ground station 8B by transmitting data to satellite 4A-22. In the example of FIG. 4C, satellite 4A-22 is in the northern hemisphere above cutoff latitude 90A, and is therefore unable to forward the data to a cross-plane neighboring satellite, such as to cross-plane neighboring satellite 4B-22. Thus, satellite 4A-22 may instead forward the data to an in-plane neighboring satellite 4A-21 that is towards the equator of Earth 2 relative to satellite 4A-22

Because satellite 4A-21 is in the northern hemisphere below cutoff latitude 90A and because the orbital plane of satellite 4A-21 is not the same as the final destination orbital plane, satellite 4A-21 may transmit data received from satellite 4A-22 to a cross-plane neighboring satellite. Because the western cross-plane direction between the orbital plane of satellite 4A-21 and the final destination plane passes through seam 50A, satellite 4A-21 may forward the data instead to the eastern cross-plane neighboring satellite 4B-21.

Satellites 4B-21 and 4C-21 may continue forwarding the data to cross-plane neighboring satellites until the data reaches satellite 4D-21, which is on the final destination plane of the data. Satellite 4D-21 may therefore determine the shortest path in which to forward the data to final destination satellite 4D-4, which may be the path northwards from satellite 4D-21, and satellite 4D-4 may therefore forward the data to in-plane neighboring satellite 4D-22, which may continue forwarding the data through satellites 4D-22, 4D-23, 4D-24, 4D-1, 4D-2, and 4D-3 until the data is forwarded to final destination satellite 4D-4. Final destination satellite 4D-4 may forward the data to ground station 8B, thereby successfully routing data from ground station 8C to ground station 8B via satellites 4.

Figure 4D:
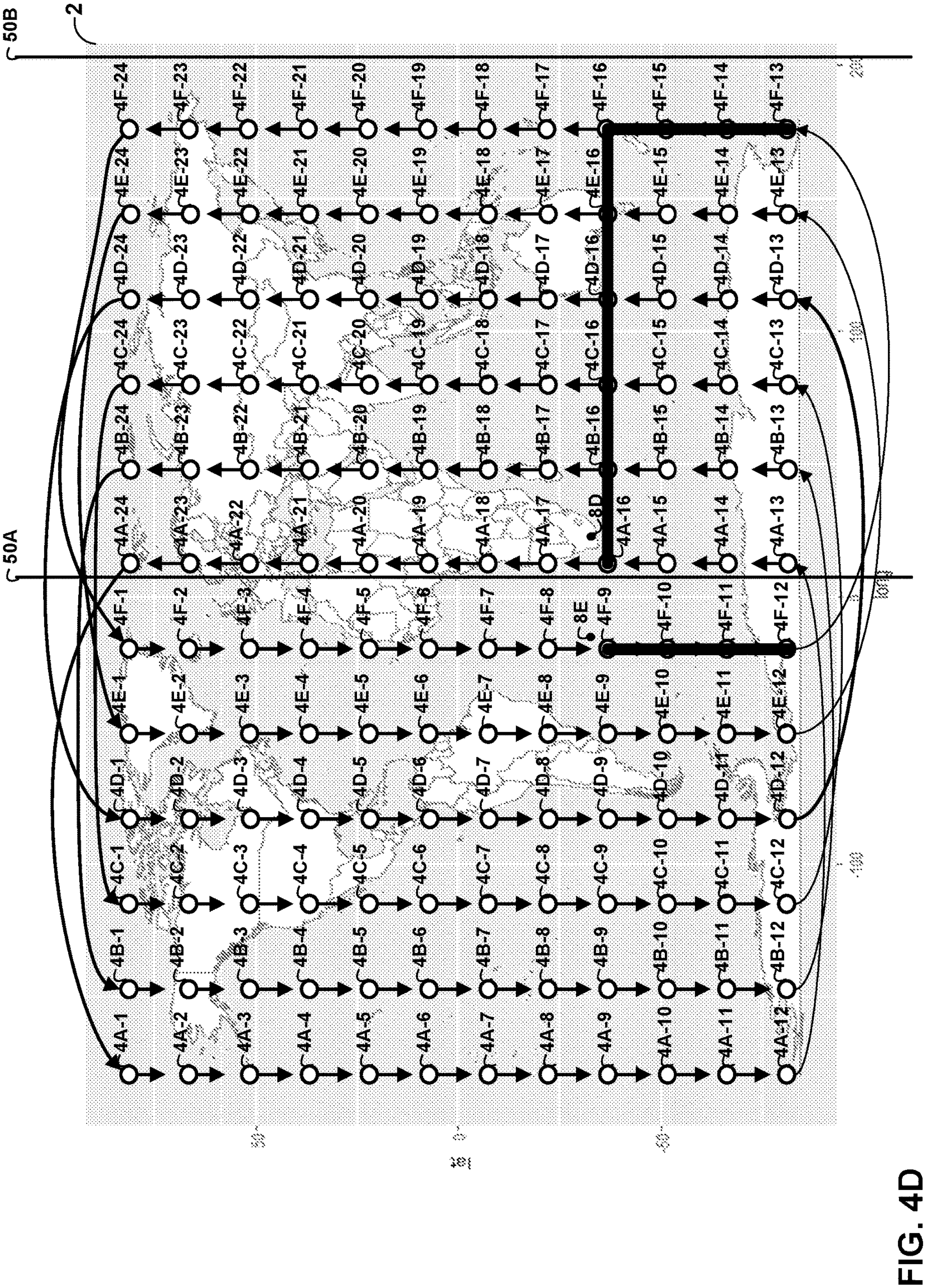

In some examples, seams may greatly lengthen the path between ground stations. As shown in FIG. 4D ground station 8B may transmit data to satellite 4A-16 to be routed to ground station 8E that may communicate with final destination satellite 4F-9 to receive data. While satellite 4F-9 is a cross-plane neighboring satellite to satellite 4A-16, satellite 4A-16 is not able to directly forward data to satellite 4F-9 because seam 50A is between satellites 4A-16 and 4F-9. Thus, satellites 4 may have to route the data away cross-wise from satellite 4F-9 from satellite 4A-16 until the data reaches satellite 4F-16 on the final destination plane so that the data can be forwarded in-plane from satellite 4F-16 to final destination satellite 4F-9.

Figure 5:
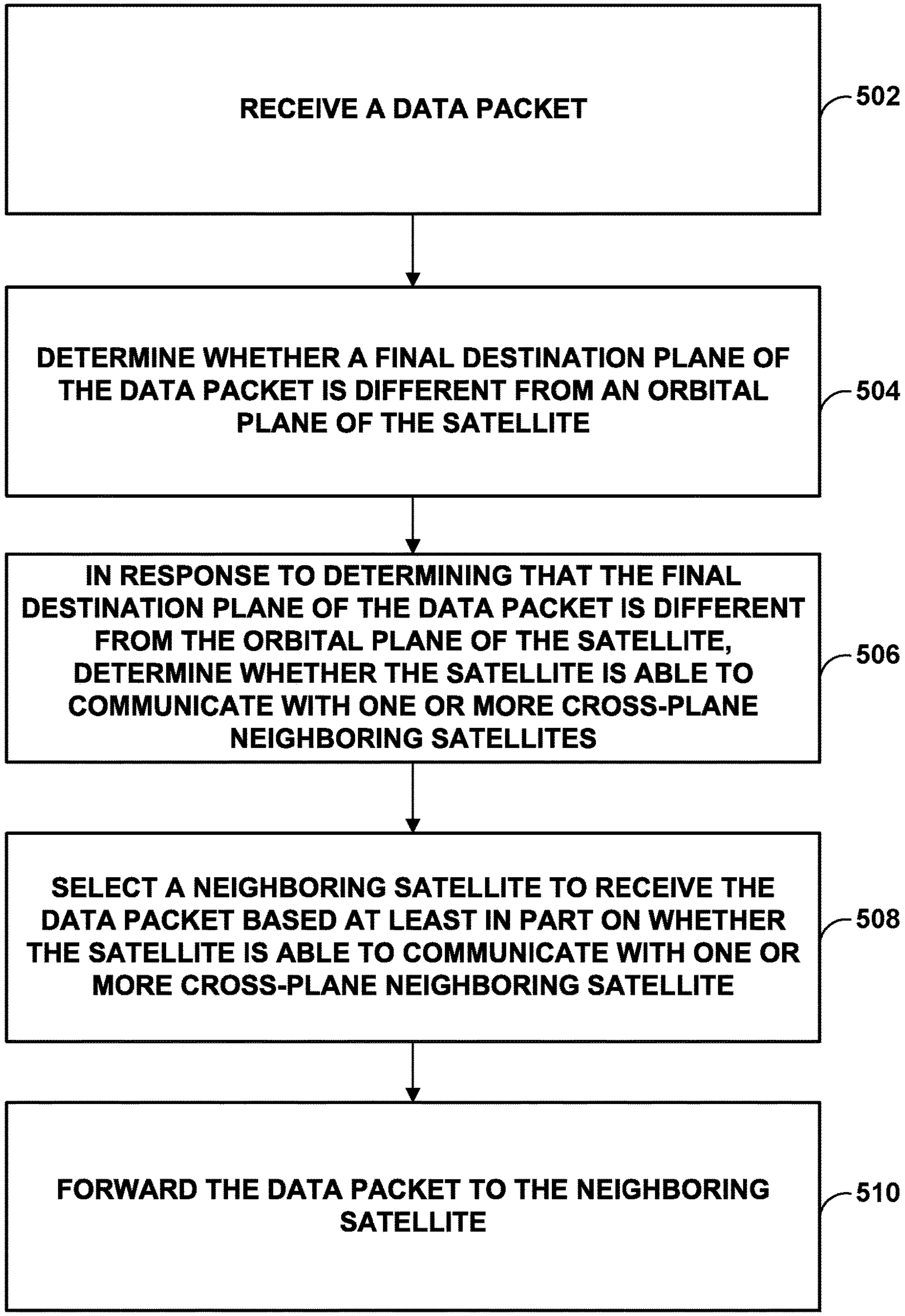
FIG. 5 is a flowchart illustrating an example mode of operation for a satellite to perform orbit-aware routing of data, in accordance with one or more techniques of the present disclosure.

FIG. 5 is a flowchart illustrating an example mode of operation for a satellite to perform orbit-aware routing of data, in accordance with one or more techniques of the present disclosure. FIG. 5 is described below in the context of satellite 12 of FIG. 3. As shown in FIG. 5, satellite 12 may receive a data packet (502). Satellite 12 may determine whether a final destination plane of the data packet is different from an orbital plane of the satellite 12 (504). Satellite 12 may, in response to determining that the final destination plane of the data packet is different from the orbital plane of the satellite 12, determine whether the satellite 12 is able to communicate with one or more cross-plane neighboring satellite (506). Satellite 12 may select a neighboring satellite to receive the data packet based at least in part on whether the satellite 12 is able to communicate with one or more cross-plane neighboring satellite (508). Satellite 12 may forward the data packet to the neighboring satellite (510).

In some examples, to select the neighboring satellite to receive the data packet, satellite 12 may, in response to determining that the satellite 12 is able to communicate with one or more cross-plane neighboring satellites, select a cross-plane neighboring satellite as the neighboring satellite to receive the data packet.

In some examples, to select the cross-plane neighboring satellite as the neighboring satellite to receive the data packet, satellite 12 may select the cross-plane neighboring satellite in a direction towards the final destination plane relative to the orbital plane of the satellite 12 that does not include a seam.

In some examples, to select the neighboring satellite to receive the data packet, satellite 12 may, in response to determining that the satellite 12 is not able to communicate with one or more cross-plane neighboring satellites, select an in-plane neighboring satellite as the neighboring satellite to receive the data packet.

In some examples, to determine whether the satellite 12 is able to communicate with one or more cross-plane neighboring satellites, satellite 12 may determine that the satellite is not in a pre-determined region that allows communication with cross-plane neighboring satellites. For example, satellite 12 may determine that the satellite 12 is at least one of: above a first cutoff latitude in the northern hemisphere of the Earth or below a second cutoff latitude in the southern hemisphere of the Earth. Satellite 12 may, in response to determining that the satellite is not in the pre-determined region that allows communication with cross-plane neighboring satellites, determining, by the satellite, that the satellite is not able to communicate with one or more cross-plane neighboring satellites. For example, satellite 12 may, in response to determining that the satellite 12 is at least one of: above the first cutoff latitude in the northern hemisphere of the Earth or below the second cutoff latitude in the southern hemisphere of the Earth, determine that the satellite 12 is not able to communicate with one or more cross-plane neighboring satellite.

In some examples to select the neighboring satellite to receive the data packet, satellite 12 may select an in-plane neighboring satellite that is closer to the equator relative to the satellite as the neighboring satellite to receive the data packet.

In some examples, satellite 12 may receive a second data packet, determine that a final destination plane of the second data packet is the same as the orbital plane of the satellite 12, and in response to determining that the final destination plane of the second data packet is the same as the orbital plane of the satellite 12, select an in-plane neighboring satellite to receive the data packet based on a number of hops to reach a final destination satellite of the second data packet.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method for orbit-aware routing, comprising:

receiving, by a satellite orbiting the Earth, a data packet;

determining, by the satellite, whether a final destination plane of the data packet is different from an orbital plane of the satellite;

in response to determining that the final destination plane of the data packet is different from the orbital plane of the satellite, determining, by the satellite, whether the satellite is able to communicate with one or more cross-plane neighboring satellites, including:

determining that the satellite is not in a pre-determined region that allows communication with cross-plane neighboring satellites based at least in part on a position of the satellite in relation to the Earth, and based at least in part on determining that the satellite is not in the pre-determined region that allows communication with cross-plane neighboring satellites, determining, by the satellite, that the satellite is not able to communicate with one or more cross-plane neighboring satellites;

selecting, by the satellite, a neighboring satellite to receive the data packet based at least in part on whether the satellite is able to communicate with the one or more cross-plane neighboring satellites; and forwarding, by the satellite, the data packet to the neighboring satellite.

2. The method of claim 1, further comprising:

receiving, by the satellite, a second data packet;

determining, by the satellite, whether a final destination plane of the second data packet is different from the orbital plane of the satellite;

based at least in part on determining that the final destination plane of the second data packet is different from the orbital plane of the satellite, determining, by the satellite, that the satellite is able to communicate with one or more cross-plane neighboring satellites;

based at least in part on determining that the satellite is able to communicate with one or more cross-plane neighboring satellites, selecting, by the satellite, a cross-plane neighboring satellite as a second neighboring satellite to receive the second data packet; and forwarding, by the satellite, the second data packet to the second neighboring satellite.

3. The method of claim 2, wherein selecting the cross-plane neighboring satellite as the second neighboring satellite to receive the second data packet further comprises:

selecting, by the satellite, the cross-plane neighboring satellite in a direction towards the final destination plane relative to the orbital plane of the satellite that does not include a seam.

4. The method of claim 1, wherein selecting the neighboring satellite to receive the data packet further comprises:

based at least in part on determining that the satellite is not able to communicate with one or more cross-plane neighboring satellites, selecting, by the satellite, an in-plane neighboring satellite as the neighboring satellite to receive the data packet.

5. The method of claim 1, wherein selecting the neighboring satellite to receive the data packet further comprises:

based at least in part on determining that the satellite is not in the pre-determined region that allows communication with cross-plane neighboring satellites, selecting, by the satellite, an in-plane neighboring satellite that is closer to the equator relative to the satellite as the neighboring satellite to receive the data packet to forward the data packet towards the pre-determined region that allows communication with cross-plane neighboring satellites.

6. The method of claim 1, further comprising:

receiving, by the satellite, a second data packet;

determining, by the satellite, that a final destination plane of the second data packet is the same as the orbital plane of the satellite;

based at least in part on determining that the final destination plane of the second data packet is the same as the orbital plane of the satellite, selecting, by the satellite, an in-plane neighboring satellite to receive the second data packet based on a number of hops to reach a final destination satellite of the second data packet; and forwarding, by the satellite, the second data packet to the in-plane neighboring satellite.

7. A satellite, comprising:

a memory; and processing circuitry operably coupled to the memory and configured to:

receive a data packet while the satellite is orbiting the Earth;

determine whether a final destination plane of the data packet is different from an orbital plane of the satellite;

in response to determining that the final destination plane of the data packet is different from the orbital plane of the satellite, determine whether the satellite is able to communicate with one or more cross-plane neighboring satellites, including:

determining that the satellite is not in a pre-determined region that allows communication with cross-plane neighboring satellites based at least in part on a position of the satellite in relation to the Earth, and based at least in part on determining that the satellite is not in the pre-determined region that allows communication with cross-plane neighboring satellites, determining that the satellite is not able to communicate with one or more cross-plane neighboring satellites;

select a neighboring satellite to receive the data packet based at least in part on whether the satellite is able to communicate with the one or more cross-plane neighboring satellites; and forward the data packet to the neighboring satellite.

8. The satellite of claim 7, wherein the processing circuitry is further configured to:

receive a second data packet;

determine whether a final destination plane of the second data packet is different from the orbital plane of the satellite;

based at least in part on determining that the final destination plane of the second data packet is different from the orbital plane of the satellite, determine that the satellite is able to communicate with one or more cross-plane neighboring satellites;

based at least in part on determining that the satellite is able to communicate with one or more cross-plane neighboring satellites, select a cross-plane neighboring satellite as a second neighboring satellite to receive the second data packet; and forward the second data packet to the second neighboring satellite.

9. The satellite of claim 8, wherein to select the cross-plane neighboring satellite as the second neighboring satellite to receive the second data packet, the processing circuitry is further configured to:

select the cross-plane neighboring satellite in a direction towards the final destination plane relative to the orbital plane of the satellite that does not include a seam.

10. The satellite of claim 7, wherein to select the neighboring satellite to receive the data packet, the processing circuitry is further configured to:

in response to determining that the satellite is not able to communicate with one or more cross-plane neighboring satellites, select an in-plane neighboring satellite as the neighboring satellite to receive the data packet.

11. The satellite of claim 7, wherein to select the neighboring satellite to receive the data packet, the processing circuitry is further configured to:

based at least in part on determining that the satellite is not in the pre-determined region that allows communication with cross-plane neighboring satellites, select an in-plane neighboring satellite that is closer to the equator relative to the satellite as the neighboring satellite to receive the data packet to forward the data packet towards the pre-determined region that allows communication with cross-plane neighboring satellites.

12. The satellite of claim 7, wherein the processing circuitry is further configured to:

receive a second data packet;

determine that a final destination plane of the second data packet is the same as the orbital plane of the satellite;

based at least in part on determining that the final destination plane of the second data packet is the same as the orbital plane of the satellite, select an in-plane neighboring satellite to receive the second data packet based on a number of hops to reach a final destination satellite of the second data packet; and forward the second data packet to the in-plane neighboring satellite.

13. A computer-readable storage medium storing instructions that, when executed by one or more processors of a satellite orbiting the Earth, cause the one or more processors of the satellite to:

receive a data packet;

determine whether a final destination plane of the data packet is different from an orbital plane of the satellite;

in response to determining that the final destination plane of the data packet is different from the orbital plane of the satellite, determine whether the satellite is able to communicate with one or more cross-plane neighboring satellites, including:

determining that the satellite is not in a pre-determined region that allows communication with cross-plane neighboring satellites based at least in part on a position of the satellite in relation to the Earth, and based at least in part on determining that the satellite is not in the pre-determined region that allows communication with cross-plane neighboring satellites, determining, by the satellite, that the satellite is not able to communicate with one or more cross-plane neighboring satellites;

select a neighboring satellite to receive the data packet based at least in part on whether the satellite is able to communicate with the one or more cross-plane neighboring satellites; and forward the data packet to the neighboring satellite.

14. The computer-readable storage medium of claim 13, wherein the instructions further cause the one or more processors to:

receive a second data packet;

determine whether a final destination plane of the second data packet is different from the orbital plane of the satellite;

based at least in part on determining that the final destination plane of the second data packet is different from the orbital plane of the satellite, determine that the satellite is able to communicate with one or more cross-plane neighboring satellites;

based at least in part on determining that the satellite is able to communicate with one or more cross-plane neighboring satellites, select a cross-plane neighboring satellite as a second neighboring satellite to receive the second data packet; and forward the second data packet to the second neighboring satellite.

15. The computer-readable storage medium of claim 14, wherein the instructions that cause the one or more processors to select the cross-plane neighboring satellite as the second neighboring satellite to receive the second data packet further cause the one or more processors to:

select the cross-plane neighboring satellite in a direction towards the final destination plane relative to the orbital plane of the satellite that does not include a seam.

16. The computer-readable storage medium of claim 13, wherein the instructions that cause the one or more processors to select the neighboring satellite to receive the data packet, further cause the one or more processors to:

based at least in part on determining that the satellite is not able to communicate with one or more cross-plane neighboring satellites, select an in-plane neighboring satellite as the neighboring satellite to receive the data packet.

17. The computer-readable storage medium of claim 13, wherein the instructions that cause the one or more processors to select the neighboring satellite to receive the data packet further cause the one or more processors to:

based at least in part on determining that the satellite is not in the pre-determined region that allows communication with cross-plane neighboring satellites, select an in-plane neighboring satellite that is closer to the equator relative to the satellite as the neighboring satellite to receive the data packet to forward the data packet towards the pre-determined region that allows communication with cross-plane neighboring satellites.

* * * * *